(12) United States Patent
Yagi

(10) Patent No.: US 6,590,745 B1
(45) Date of Patent: Jul. 8, 2003

(54) MAGNETIC HEAD, METHOD OF MANUFACTURING SAME, AND MAGNETIC DISK APPARATUS

(75) Inventor: Ichiro Yagi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/484,794

(22) Filed: Jan. 18, 2000

(30) Foreign Application Priority Data

Jan. 26, 1999 (JP) .......................................... 11-016929

(51) Int. Cl.⁷ .............................................. G11B 15/62
(52) U.S. Cl. .................................. 360/235.4; 29/603.12
(58) Field of Search ................................ 360/126, 122, 360/234.3, 235.1, 235.2, 235.4, 235.8, 235.9, 236.6, 237.1, 317, 234.7, 234.8; 29/603.13; 428/114, 336

(56) References Cited

U.S. PATENT DOCUMENTS

| | | | | |
|---|---|---|---|---|
| 5,052,099 A | * | 10/1991 | Taguchi et al. .............. | 29/603 |
| 5,165,981 A | * | 11/1992 | Yamakawa et al. ......... | 428/114 |
| 5,296,982 A | * | 3/1994 | Terada et al. ............... | 360/126 |
| 5,413,850 A | * | 5/1995 | Nehring ....................... | 428/336 |
| 5,636,092 A | * | 6/1997 | Nasu et al. .................. | 360/122 |
| 5,670,253 A | * | 9/1997 | Chiu et al. ................... | 428/336 |
| 5,781,376 A | * | 7/1998 | Tsukamoto ............. | 360/235.1 |
| 5,833,871 A | | 11/1998 | Matsushita et al. ........... | 216/22 |
| 5,838,522 A | * | 11/1998 | Komvopoulos et al. .... | 360/122 |
| 6,101,066 A | * | 8/2000 | Ishihara et al. .......... | 360/236.6 |
| 6,201,663 B1 | * | 3/2001 | Yamaguchi et al. ..... | 360/235.1 |
| 6,219,200 B1 | * | 4/2001 | Waki et al. .................. | 360/126 |

FOREIGN PATENT DOCUMENTS

| | | | |
|---|---|---|---|
| JP | 59-11527 | | 1/1984 |
| JP | A-61-50906 | | 3/1986 |
| JP | 61204384 A | * | 9/1986 |
| JP | A-61-246380 | | 11/1986 |
| JP | A-63-37874 | | 2/1988 |
| JP | 01-213820 | | 8/1989 |
| JP | 2-95807 | | 4/1990 |
| JP | A-2-95807 | | 4/1990 |
| JP | 3-113810 | | 5/1991 |
| JP | 4-195808 | | 7/1992 |
| JP | 04-196949 | | 7/1992 |
| JP | A-5-94618 | | 4/1993 |
| JP | A-5-159276 | | 6/1993 |
| JP | A-6-44717 | | 2/1994 |
| JP | 8-36852 | | 2/1996 |
| JP | 8-297818 | | 11/1996 |
| JP | 09-273985 | | 9/1997 |
| SG | P-No. 83182 | | 12/2001 |

* cited by examiner

*Primary Examiner*—Hoa T. Nguyen
*Assistant Examiner*—Tianjie Chen
(74) *Attorney, Agent, or Firm*—Oliff & Berridge, PLC (57) ABSTRACT

A magnetic head with an air bearing surface to which an appropriate roughness, a method of manufacturing the same, and a magnetic disk apparatus are provided. A head core part is formed on a base body made of altic formed by dispersing grain titanium carbide into alumina, and then an air bearing surface is formed. Next, plasma oxidation is performed so that a number of protrusions with height of about 5 nm are selectively formed only on the base-body region of the air bearing surface. The protrusions are composed of titanium oxide formed by the exposed portion among titanium carbide grains on the air bearing surface being selectively oxidized. Growth of the protrusions is promoted by applying photoresist on the ABS and removing it before performing plasma oxidation. The magnetic head has no risk of adsorbing a recording medium so that it has excellent CSS.

8 Claims, 8 Drawing Sheets

MAGNETIC HEAD, METHOD OF MANUFACTURING SAME, AND MAGNETIC DISK APPARATUS

BACKGROUND OF THE INVENTION

1. Field of the Invention

The invention relates to a magnetic head comprising a head core part which includes at least either a magnetic head element for writing or a magnetic head element for reading formed on a base body, a method of manufacturing the same, and a magnetic disk apparatus.

2. Description of the Related Art

Figure 11:
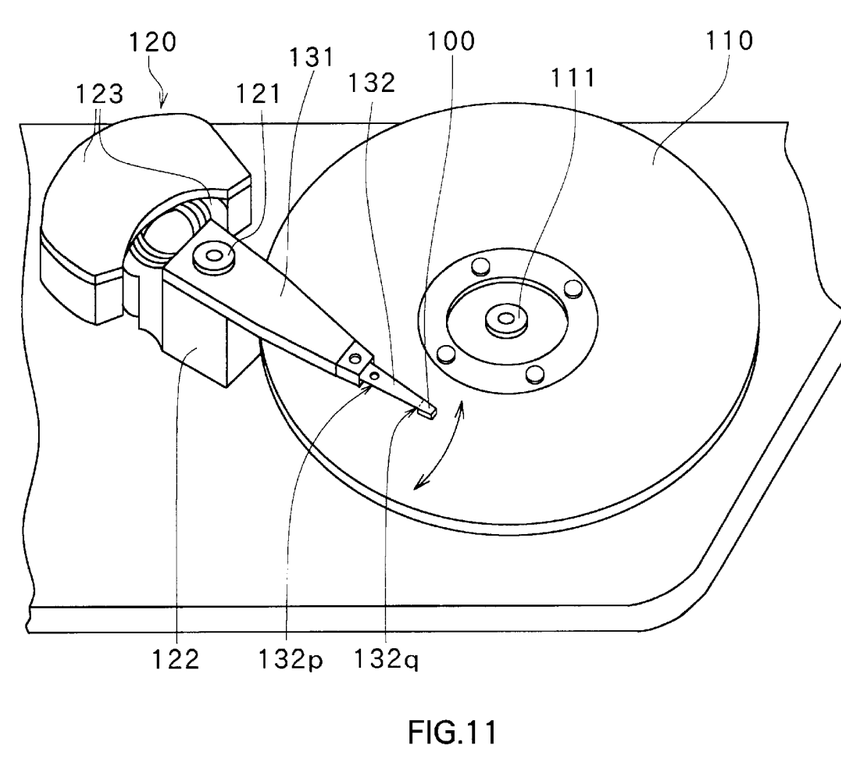
FIG. 11 is a perspective view showing the configuration of a magnetic disk apparatus as an example of a magnetic recording device.

In recent years, research and development for improving surface recording density has been actively carried out in the field of magnetic recording devices such as computers. FIG. 11 shows a general configuration of a magnetic disk apparatus as an example of a magnetic recording device. In the magnetic disk apparatus, a magnetic head slider (also simply referred as magnetic head or head in the followings) 100 including a base body and a head core part formed on the base body is placed so as to face a surface of a magnetic disk (also simply referred as disk in the followings) 110 as a recording medium. Although, a magnetic disk apparatus usually has a plurality of magnetic disks and one magnetic head slider is respectively provided on each surface of the magnetic disks, only one magnetic head slider and one magnetic disk are shown in FIG. 11 and the rest of them are omitted therein. The magnetic disk 110 rotates by a spindle motor 111. The magnetic head 100 is held by the end portion 132q of a suspension 132. The other end portion 132q of the suspension 132 is attached to the end portion of a drive arm 131. The magnetic disk apparatus also comprises a carriage unit 120 at the base side of the drive arm 131 for positioning the magnetic head 100 on the track of the magnetic disk 110. The carriage portion 120 has a carriage 122 which swings about the shaft 121, and an actuator 123 composed of a voice coil motor and so on. The actuator 123 drives the carriage 122 to swing about the shaft 121 so that the magnetic head 100 can be moved in the radial direction (arrow direction shown in FIG. 11) of the magnetic disk 110.

In the magnetic disk apparatus with such a configuration, in general, recording/reproducing of information is performed as follows. The head 100 pressed by the suspension 132 is in contact with the disk 110 when the disk 110 is not rotating. When the disk 110 is rotated, an airflow generates between the head 100 and the disk 110 so that a lift is created. As a result, the head 100 flys to leave from the surface of the disk 110, and performs recording/reproducing of information by relatively shifting on the disk 110 while holding a small space in therebetween by keeping the balance of the lift and the pressure from the suspension 132. Such a recording/reproducing system is called CSS (Contact-Start-Stop) system.

The surface where the magnetic head and the magnetic disk are contacted together is preferable to be smooth in order for the magnetic disk apparatus to have high surface recording density. Particularly, in the device with CSS system, it is preferable that the state both contacted surfaces of the head and the disk does not change (that is, excellent in CSS characteristic) even after repeating the CSS operation for a number of times. However, when both of the surface of the head and the disk are smooth, the head and the disk adsorb each other resulting in deterioration of the CSS characteristic. Accordingly, in the magnetic disk apparatus of the related art, the adsorb phenomenon is avoided by roughing either one of the surface of the head or the disk.

An example of roughing the surface of the disk is disclosed in Japanese Patent Application Laid-open Sho 61-246380, Hei 5-94618 and Hei 5-159276. In Japanese Patent Application Laid-open Sho 61-246380, a method of roughing the surface of the disk as a recording medium by applying a heat treatment in an oxygen atmosphere to a magnetic disk substrate with nickel (Ni) alloy plating layer formed on its surface is disclosed. In Japanese Patent Application Laid-open Hei 5-94618, a method of adjusting the roughness of the disk surface by applying a heat treatment to a magnetic disk substrate made of amorphous carbon under the existence of oxidation gas is disclosed. In Japanese Patent Application Laid-open Hei 5-159276, a magnetic disk is disclosed in which the surface is roughed by, for example, anodizing titanium (Ti) or titanium alloy to form titanium oxide ($TiO_2$).

However, in a case where the surface of the magnetic disk is made rough as described, the head core part may be damaged when the disk and the head are in contact.

On the other hand, for example, Japanese Patent Application Laid-open Sho 63-37874 and Hei 6-44717 disclose an example of roughing the surface, facing the magnetic disk, of the magnetic head (referred as ABS (Air Bearing Surface) or air bearing surface in the followings). Japanese Patent Application Laid-open Sho 63-37874 discloses, under consideration of the contact area of the ABS and the surface of the magnetic disk, a magnetic head constructed so as to control the contact area smaller than a predetermined value. However, the specific control method is not disclosed. Japanese Patent Application Laid-open Hei 6-44717 discloses, under consideration of the roughness of the ABS, a magnetic head in which the roughness of the surface is limited. However, the specific method for implementing the control of the roughness of the surface is not disclosed therein.

Further, Japanese Patent Application Laid-open Hei 2-95807 discloses a method of obtaining a plurality of magnetic heads by forming a plurality of head cores on a base body made of sintered ferrite and then cutting the base body. With this method, coming-off of the grains from the surface areas of the base body can be prevented by applying a heat treatment to the base body in an oxygen atmosphere. However, articles regarding roughing the ABS is not disclosed.

As represented by the two examples described above, logic of the magnetic head with the roughed ABS has been brought up, however, specific and effective means for implementing it has not been contrived. For example, the ABS can be made rough by polishing the surface using a rough abrasive grain. However, there is a problem with this method that the head core part is damaged while polishing. Accordingly, it is desired to develop a magnetic head with the ABS being roughed without damaging the head core part.

Furthermore, a method of manufacturing alumina-type materials for magnetic head is disclosed in Japanese Patent Application Laid-open Sho 61-50906, however, a method of manufacturing the magnetic head itself and its configuration is not mentioned therein.

SUMMARY OF THE INVENTION

The invention is designed to overcome the foregoing problems. It is an object to provide a magnetic head with a surface (ABS), which is to face a recording medium, being appropriately roughed without damaging the head core part, a method of manufacturing the same, and a magnetic disk apparatus.

A magnetic head of the invention comprises a base body and a head core part formed on the base body including at least either a magnetic head element for writing or a magnetic head element for reading. In the magnetic head, an end face of the base body and an end face of the head core part form a flat surface which is to face a recording medium while the end face of the base body is rougher than the end face of the head core part.

A method of manufacturing a magnetic head of the invention which comprises a base body and a head core part formed on the base body including at least either a magnetic head element for writing or a magnetic head element for reading includes steps of: forming a flat surface including an end face of the base body and an end face of the head core part, the flat surface being to face a recording medium, after forming the head core part on the base body; and selectively roughing the end face of the base body of the flat surface by performing a chemical processing thereon.

A magnetic disk apparatus of the invention comprises a magnetic head which includes a base body and a head core part formed on the base body including at least either a magnetic head element for writing or a magnetic head element for reading. In the magnetic disk apparatus, an end face of the base body and an end face of the head core part form a flat surface which is to face a recording medium while the end face of the base body is rougher than the end face of the head core part.

In each of the magnetic head, the method of manufacturing the same and the magnetic disk apparatus of the invention, an end face of the base body among a flat surface which includes the end face of the base body and an end face of the head core part is selectively roughed so as to make it rougher than the end face of the head core part.

In each of the magnetic head, the method of manufacturing the same and the magnetic disk apparatus of the invention, protrusions of a predetermined height may be formed only on an end face of the base body. The height of the protrusions are preferable to lie within a range of 2 nm to 7 nm.

In each of the magnetic head, the method of manufacturing the same and the magnetic disk apparatus of the invention, it is preferable to construct the base body by dispersing grains made of at least either metal or metallic compound into a base material made of insulating substance. Specifically, it is preferable to be constructed by dispersing at least titanium carbide (TiC) into a base material made of aluminum oxide ($Al_2O_3$).

In each of the magnetic head, the method of manufacturing the same and the magnetic disk apparatus of the invention, the protrusions may be formed on an end face of the base body by performing a predetermined chemical processing to the grains exposed on the end face of the base body. The chemical processing may be performed in a plasma atmosphere of a predetermined chemical element. It is preferable to be performed by an oxidation processing.

In the method of manufacturing the magnetic head of the invention, after the step of forming the flat surface, a step of performing a surface processing on the end face of the base body may be included before the step of roughing the surface. As an example of the surface processing, there is a processing including a step of forming a predetermined coating on the end face of the base body and a step of removing the coating. As coating, a photoresist film used in photolithography may be formed.

Other and further object, features and advantages of the invention will appear more fully from the following description.

DETAILED DESCRIPTION OF THE PREFERRED EMBODIMENTS

Preferred embodiments of the invention will be described in detail with reference to the drawings in the followings. As an example of a magnetic head of the invention, a composite thin film magnetic head with a configuration in which a recording head including an inductive-type magnetic transducer for writing and a reproducing head including a magnetoresistive (referred as MR in the followings) element for reading are stacked, and a method of manufacturing the same will be described.

[First Embodiment]

Figure 1:
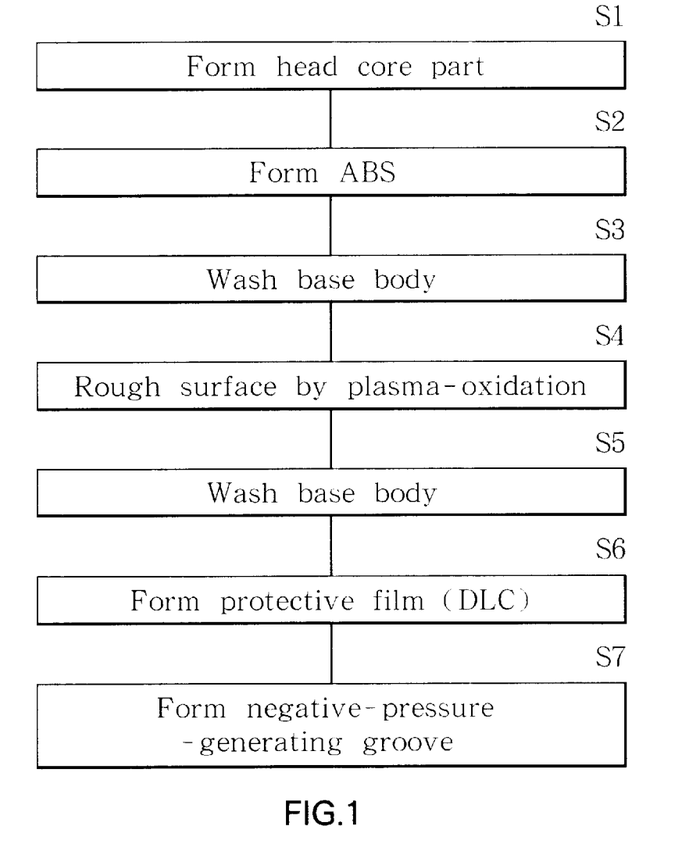
FIG. 1 is a flow chart showing a method of manufacturing a magnetic head according to a first embodiment of the invention.
Figure 2:
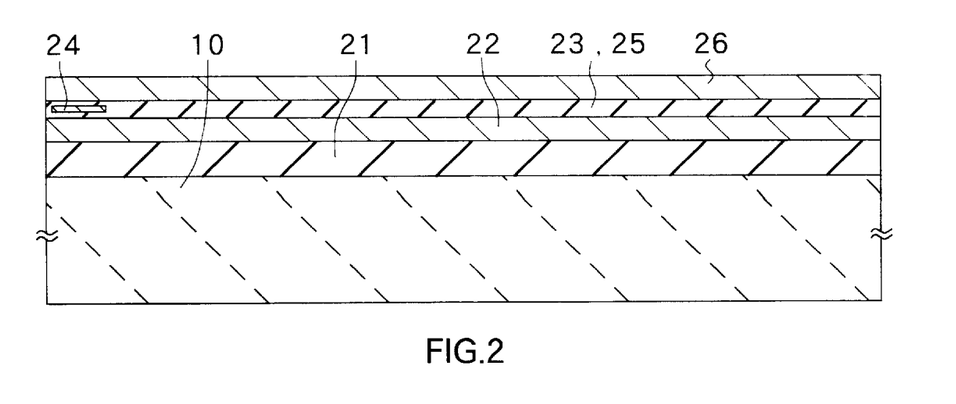
FIG. 2 is a cross section for explaining a process in the method of manufacturing the magnetic head according to the first embodiment of the invention.
Figure 3:
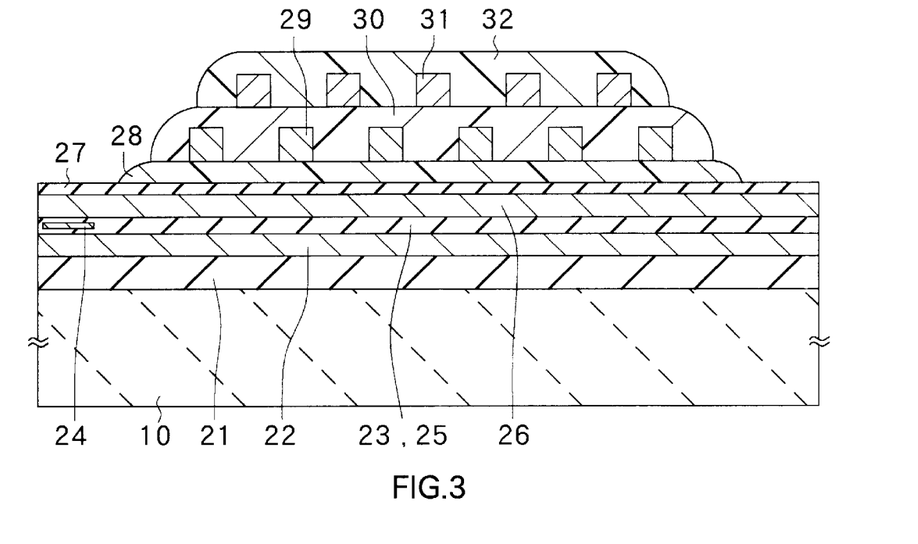
FIG. 3 is a cross section for explaining a process following FIG. 2.
Figure 4:
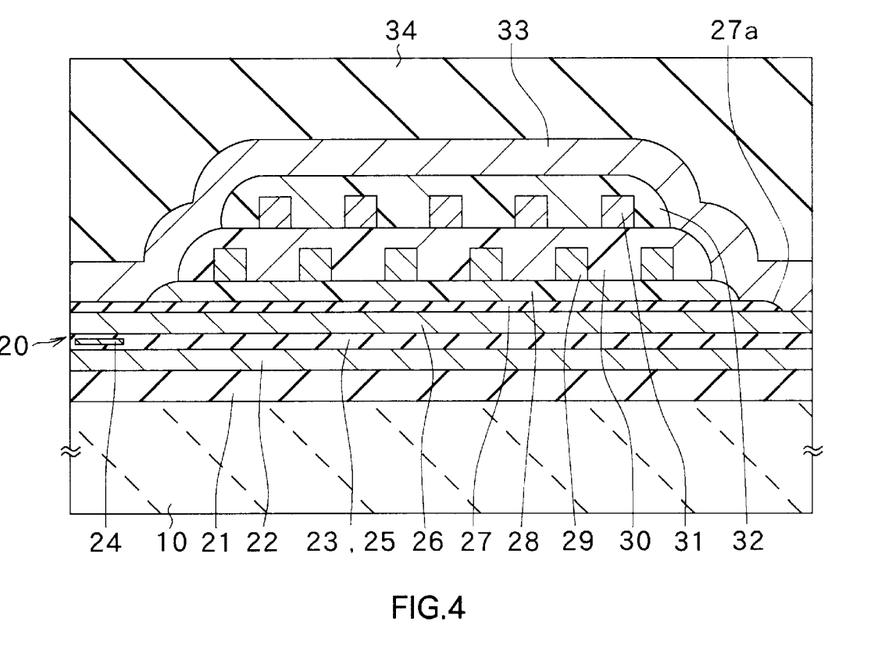
FIG. 4 is a cross section for explaining a process following FIG. 3.
Figure 5A:
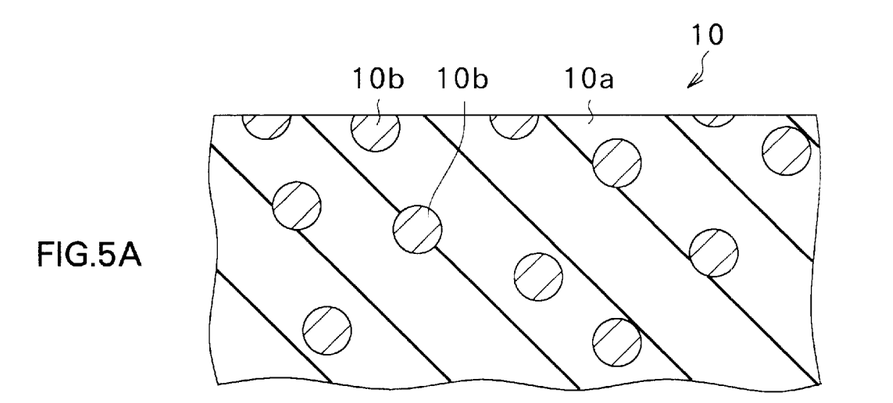
FIGS. 5A and 5B are sample drawings showing a cross-sectional configuration of a base body forming the magnetic head according to the first embodiment of the invention.
Figure 5B:
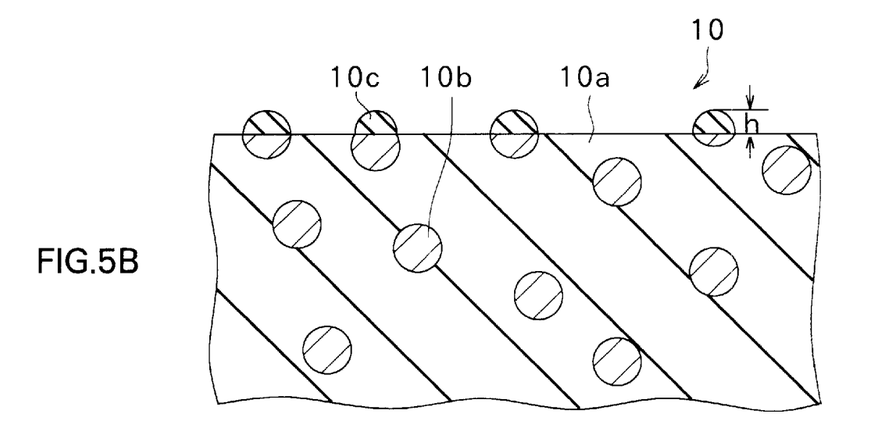
Figure 6:
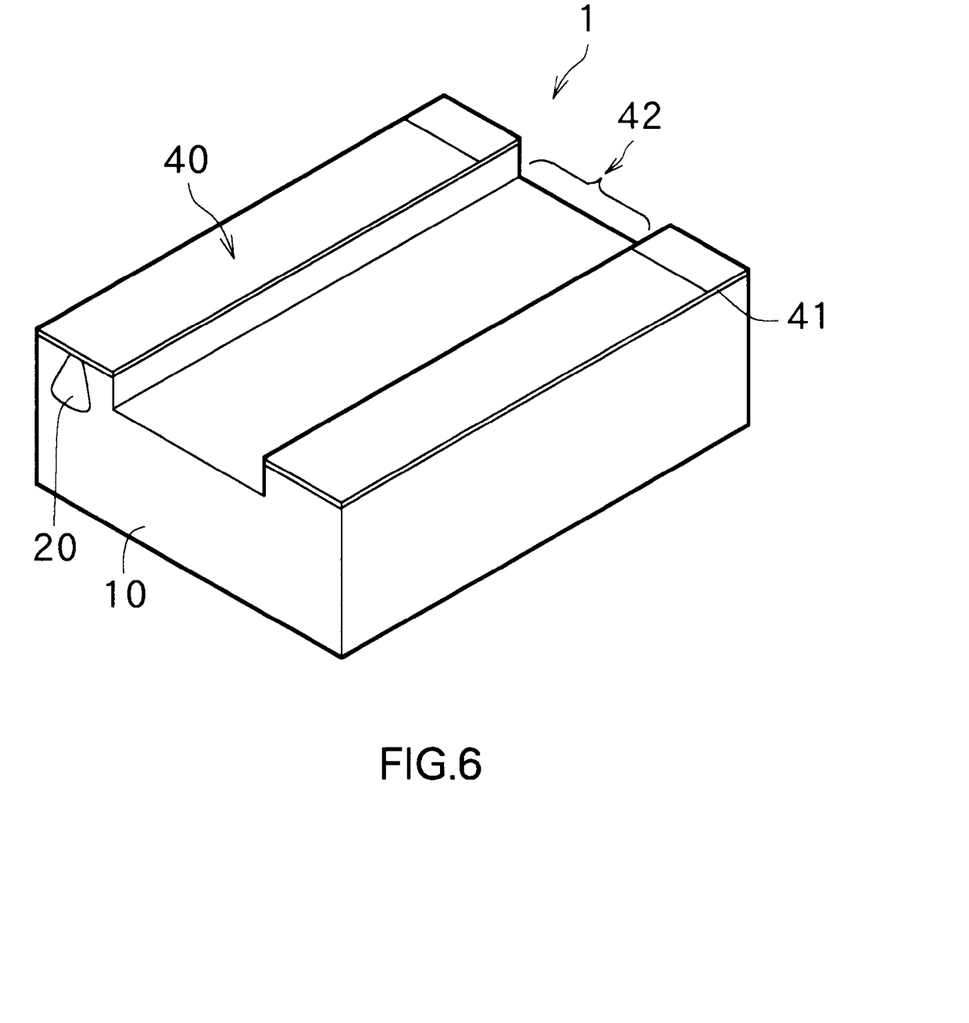
FIG. 6 is a perspective view showing the external configuration of the magnetic head according to the first embodiment of the invention.

First, with reference to FIG. 1 to FIG. 6, a method of manufacturing a composite thin film magnetic head will be described as a method of manufacturing a magnetic head according to a first embodiment of the invention. A magnetic head according to the embodiment will be embodied through a method of manufacturing a magnetic head according to the embodiment, so that both will be described together in the followings. FIG. 1 is a flow chart showing the manufacturing method according to the embodiment. FIG. 2 to FIG. 4 are cross sections showing the principal steps of the manufacturing method according to the embodiment. Furthermore, FIG. 2 to FIG. 4 shows cross sections vertical to the air bearing surface. FIG. 5 shows a simulated cross sectional configuration of a base body of the magnetic head. FIG. 6 is a perspective view of a magnetic head slider according to the embodiment from the air bearing surface side. The magnetic head slider 1 shown in FIG. 6 is, for example, used in the same position as a magnetic head slider 100 of the magnetic disk apparatus shown in FIG. 11. The whole configuration of the magnetic disk apparatus according to the embodiment is similar to the one shown in FIG. 11 so that the description will be omitted herein.

In the manufacturing method according to the embodiment, first, as shown in FIG. 1, a head core part is formed on a base body 10 made of, for example, altic ($Al_2O_3$.TiC) through a method described in the following (step S1 in FIG. 1). As shown in FIG. 5A, altic which is the material of the base body 10 is formed by dispersing grain titanium carbide (TiC) 10b into aluminum oxide ($Al_2O_3$: also referred as alumina in the followings) 10a which is an insulating material. Diameter of the grain titanium carbide 10b is, for example, about 2–3 $\mu$m.

Next as shown in FIG. 2, an insulating layer 21 made of, for example, alumina is deposited on the base body 10. On the insulating layer 21, a bottom shield layer 22 for a reproducing head is formed. On the bottom shield layer 22, a shield gap film 23 is formed by depositing, for example, alumina to the thickness of 100–200 nm (nanometer) through sputtering. On the shield gap film 23, an MR film 24 in order to construct an MR element for reproduction is formed in few tens of nanometers in thickness, and patterned to a desired shape through photolithography with high precision. Next, after forming a lead layer (not shown in figure) as a leader electrode layer which is electrically connected to the MR film 24 on both sides thereof, a shield gap film 25 is formed on the lead layer, the shield gap film 23 and the MR film 24 so that the MR film 24 is buried in the shield gap films 23 and 25. A top shield-cum-bottom pole (referred as bottom pole in the followings) 26 made of magnetic material such as permalloy (NiFe), which is used for both the reproducing head and the recording head, is formed on the shield gap film 25. The MR element made of the MR film 24 corresponds to an example of 'magnetic head element for reading' of the invention.

Next, as shown in FIG. 3, a recording gap layer 27 made of insulating material such as alumina is formed on the bottom pole 26, and a photoresist layer 28 is formed on the recording gap layer 27, in a predetermined pattern through photolithography with high precision. On the photoresist layer 28, a thin film coil 29 for an inductive recording head made of, for example, copper (Cu) as a first layer of the thin film coils is formed by, for example, plating method. Subsequently a photoresist layer 30 is formed in a predetermined pattern so as to cover the photoresist layer 28 and the coil 29 through photolithography with high precision. Annealing at, for example, 250° C. is performed in order to flatten the coil 29 and insulate between the turns of the coil 29. On the photoresist layer 30, a thin film coil 31 made of, for example, copper as a second layer of the thin film coils is formed by, for example, plating method. A photoresist layer 32 is formed with a predetermined pattern on the photoresist layer 30 and the coil 31 through photolithography with high precision, and annealing at, for example, 250° C. is performed in order to flatten the coil 31 and insulate between the turns of the coil 31.

Next, as shown in FIG. 4, in a position rearward of the coils 29 and 31 (right side in FIG. 4), an opening 27a is formed for making a magnetic path by partially etching the recording gap layer 27. A top yoke-cum-top pole (referred as top pole in the followings) 33 made of magnetic materials for the recording head such as permalloy is selectively formed on the recording gap layer 27 and photoresist layers 28, 30, 32. The top pole 33 has a contact with the bottom pole 26 through the opening 27a to be magnetically coupled to each other. The recording gap layer 27 and the bottom pole 26 are etched to about 0.5 $\mu$m by ion milling using the top pole 33 as a mask. By forming an overcoat layer 34 made of, for example, alumina on the top pole 33, a head core part 20a is implemented. The part including the bottom pole 26, the recording gap layer 27, the coils 29,31, and the top pole 33 corresponds to an example of 'magnetic head element for writing' in the invention.

After completing the head core part 20 as described, an air bearing surface 40 as a flat surface including an end face of the base body 10 and an end face of the head core part 20 is formed by, for example, performing a mechanical processing on the base body 10 and the head core part 20. The air bearing surface 40 is made to be a mirror by, for example, lapping (step S2). The mirror means that the difference in height between protrusion and concave on the air bearing surface 40 is smaller than 1 nm. Lapping is preferable to be performed by loose abrasive machining using, for example, 0.1–0.3 $\mu$m diamond abrasives.

Polishing debris caused while lapping is removed through washing the base body 10 by rotating a brush made of fiber such as nylon. N-methyl pyrrolidone, for example, is employed as washing solvent. Then, the base body 10 is rinsed with, for example, isopropyl alcohol and dried (step S3).

The base body 10 is, for example, placed inside a chamber which is filled with oxygen plasma to plasma-oxidize the air bearing surface 40. During oxidation, the pressure inside the chamber is adjusted to be about 1 Torr, and nitrogen gas ($N_2$) is supplied for 5 minutes and then oxygen gas ($O_2$) is supplied for 10 minutes. Nitrogen gas is supplied to make temperature of the chamber inside, instruments in the chamber and base body 10 equal by performing nitrogen-discharge before supplying oxygen gas. The plasma-oxidation is performed with temperature of, for example, 40° C. and high-frequency output power of, for example, 200 W. As a result, as shown in FIG. 5B, the portion exposed to the air bearing surface 40 among the grain titanium carbide 10b which forms the base body 10 is selectively oxidized so that it is protruded from the air bearing surface 40 with forming a titanium oxide ($TiO_2$) 10c. That is, a plurality of fine protrusions are formed on the base-body region of the air bearing surface 40 so that only the base-body region of the air bearing surface 40 is roughed. Accordingly, in the air bearing surface 40, the roughness of the surface of the base-body region becomes rougher than that of the region of the head core part which is made to be smooth. The grain titanium carbide 10b is buried in the alumina 10a which is the base material so that expansion of volume occurred by reaction of titanium (Ti) and oxygen (O) extends only towards the height direction (upward/downward direction in figure). Accordingly, there is no change in diameter of the grain in lateral direction (right/left direction in figure).

In this instance, height h of the protrusion is preferable to lie within a range of 2–7 nm. It is because, when it is smaller than 2 nm, the surface of the air bearing surface 40 becomes too smooth so that the surface adsorb the disk, and when it is larger than 7 nm, the disk may be damaged. Furthermore, it is more preferable to make it within a range of 3–6 nm. Moreover, it is the best to make it 5 nm which is the height reached by performing plasma-oxidation for 20 minutes considering the manufacturing condition described in the followings. Further, there may be a case where a sampling test is performed to verify the roughness of the surface of the air bearing surface 40 using Atomic Force Microscope (AFM) after performing plasma-oxidation.

Next, the base body 10 is washed by the same method as the above-mentioned washing step (step S5).

Next, as shown in FIG. 6, a protective film 41 made of DLC (Diamond-like Carbon) with the thickness of 5–10 nm is formed on the whole surface of the air bearing surface 40 by performing, for example, plasma CVD (Chemical Vapor Deposition) (step S6).

At last, a negative-pressure-generating groove 42 for making the magnetic head fly from the recording medium is formed by selectively etching the region other than the region corresponding to the head core part 20 of the air bearing surface 40 in order to have the air bearing surface 40 assume a recessed shape (step S7). Further, each magnetic head as shown in FIG. 6 is implemented by following through a dividing procedure by machine processing. The negative-pressure-generating groove 42 is formed to generate airflow while the recording medium is rotated. During rotating the recording medium, pressure inside the negative-pressure-generating groove is lower than that of outside. In this instance, the head core part 20 is protected by the protective film 41 so that it is not be damaged.

Next, operation of the magnetic head will be described.

In the magnetic head, magnetic flux for writing generates by feeding electric current to the coils 29 and 31 of the recording head so that information is recorded on a magnetic recording medium. Information recorded on the magnetic recording medium is read out by feeding sensing current to the MR film 24 of the reproducing head to detect leakage of magnetic flux from the magnetic recording medium.

In this instance, adsorption of the magnetic head and the magnetic recording medium is effectively suppressed even in a case where the region of the head core part is made flattened, since the base-body region of the air bearing surface 40 has a number of fine protrusions formed with titanium oxide. Further, the air bearing surface 40 is sufficiently protected by the protective film 41 so that the head core part 20 is not damaged even in a case where the magnetic head and the magnetic recording medium are in contact.

According to the embodiment as described above, after flattening the air bearing surface 40 by lapping, a number of fine protrusions are selectively formed only on the base-body region of the air bearing surface 40 by performing. As a result, even in a state as if the surface of the disk and the whole of the air bearing surface of the head are likely in contact when the disk is not rotating, actually, only the protrusions in the base-body region which occupy most of the ABS areas of the head are in contact with the disk, and the region of the head core part of the air bearing surface is not in contact with the surface of the disk. Accordingly, adsorption of the head and the disk can be effectively suppressed without damaging the head core part 20 even at the time of the starting/stopping operation. As a result, in the magnetic disk apparatus to which the magnetic head of the embodiment is applied, the disk is not required to be made rough for considering deterioration of CSS characteristic, and the disk with the surface polished like a mirror can be used. Accordingly, in such a respect, there is less possibility for the head core part of the magnetic head to receive a damage at the time of the starting/stopping operation.

In the embodiment, the air bearing surface which includes the end face of the head core part 20 is covered by the protective film 41 so that damaging of the head core part of the magnetic head can be effectively suppressed by this as well. Further, even at the time of etching (FIG. 1 S7) for forming the negative-pressure-generating groove 42 on the air bearing surface of the head, damage to the head core part 20 becomes less by having the protective film 41 on air bearing surface 40 so that yield of manufacturing is improved.

In the embodiment, plasma oxidation is performed to make the height of the protrusion formed with titanium oxide 2–7 nm, which is the best value, so that the two objects of improving CSS characteristic and suppressing damage to the recording medium can be simultaneously and most effectively achieved.

[Second Embodiment]

Figure 7:
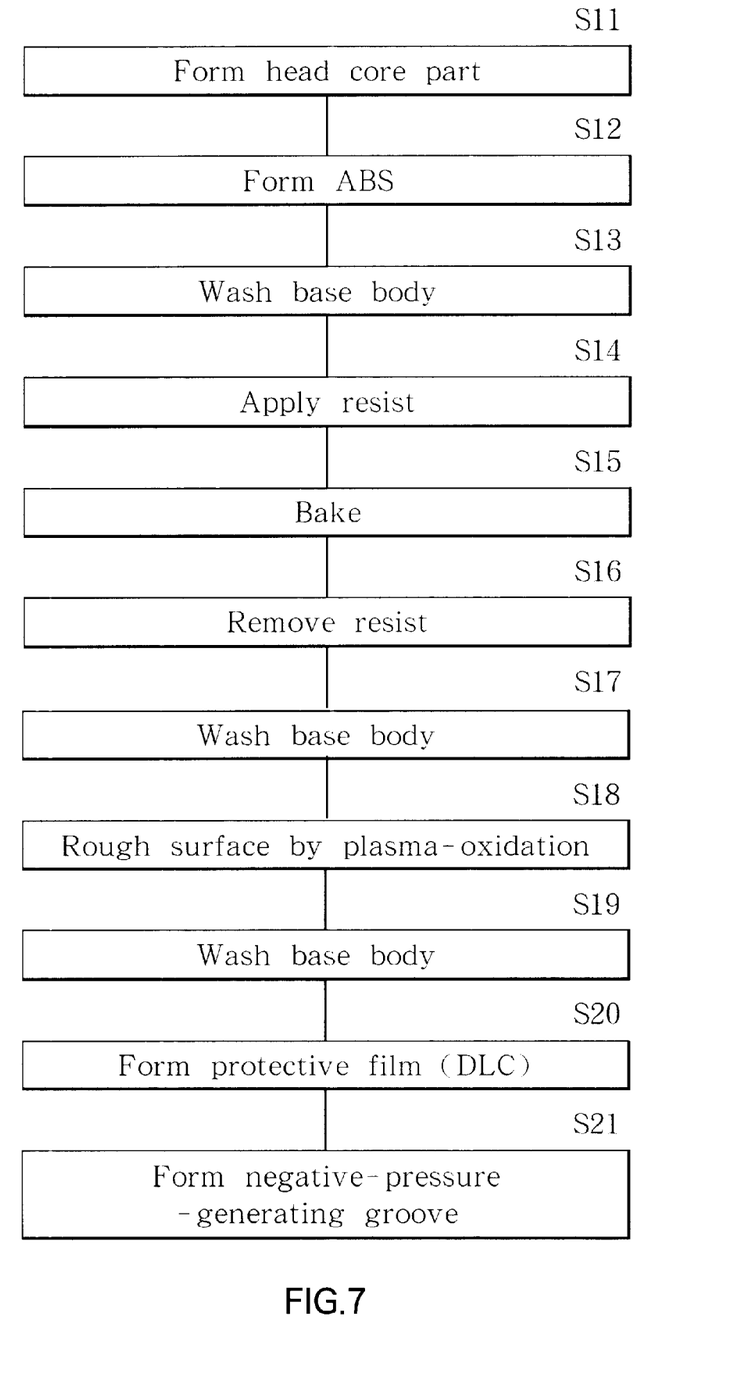
FIG. 7 is a flow chart showing a method of manufacturing a magnetic head according to a second embodiment of the invention.

FIG. 7 is a flow chart showing a method of manufacturing a composite thin film magnetic head as a method of manufacturing a magnetic head according to a second embodiment of the invention.

The manufacturing method according to the embodiment follows through the same procedure as the first embodiment except that a step of applying resist (step S14), a step of baking (step S15), a step of removing resist (step S16) and a step of washing (step S17) are added between the step of washing (step S3) and the step of oxidizing of the manufacturing method of the first embodiment. Accordingly, the description similar to the first embodiment will be omitted herein. The step of applying resist corresponds to 'step of forming coating' and the step of removing resist to 'step of removing coating' of the invention.

In the step of applying resist (step S14), for example, photoresist is applied to the air bearing surface. It is preferable to be done by dipping method which is simple, since fine adjustment in the thickness of the photoresist is not required.

The photoresist is dried by baking the base body on, for example, a hot plate at a temperature of about 60–100° C., preferably 80° C. for 40–80 minutes, preferably 60 minutes (step S15).

The photoresist is removed by using organic solvent such as acetone or alkaline separation solution such as sodium phosphate (step S16). In this instance, development is not performed so that the separation solution may not be necessarily employed. Accordingly, it is preferable to use organic solvent which is not only able to remove resist easily but also less costly and. Further, the base body is washed by the same method as the step of washing (step S3) described above.

In the embodiment, after lapping the air bearing surface, photoresist is applied to the air bearing surface and then removed before performing oxidation processing on the base body. With the procedure, the protruding amount of the protrusion formed with titanium oxide can be made to a desired value. One of the reason for this may be that contamination attached to the air bearing surface is removed by applying and removing the resist so that oxidation of titanium is promoted.

Next, an effect obtained through the embodiment will be described based on the specific measurement result with reference to FIG. 8 to FIG. 10.

Figure 8:
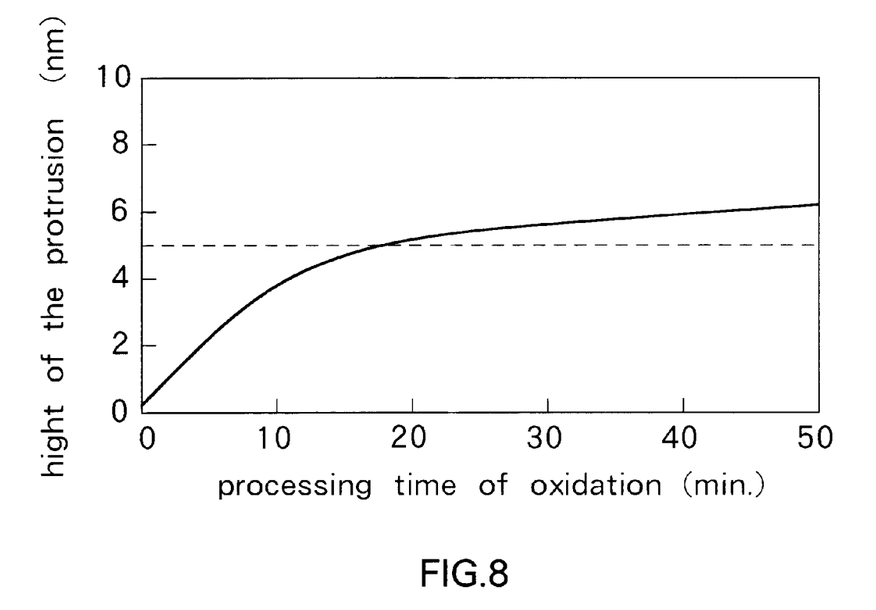
FIG. 8 is a characteristic graph showing correlation between oxidation time and amount of protruding (height of protrusion) on a base-body region of an air bearing surface in a method of manufacturing the magnetic head according to the invention.

FIG. 8 shows the relation between the height of the protrusion of the air bearing surface and the processing time of plasma oxidation when forming the air bearing surface by the method according to the second embodiment. Specifically, it shows the result of measuring the height (amount of protruding) in the base-body region of the air bearing surface using AFM, after applying photoresist (step S14), baking it (step S15), removing it (step S16) and oxidizing the air bearing surface of the magnetic head for various length of time (step S18). Axis of ordinates represents the height h (nm) of the protrusion and axis of abscissas represents the processing time (minutes) of oxidation.

As shown in FIG. 8, it is evident that the protrusion of 2–7 nm are formed on the base-body region of the air bearing surface. That is, it is made evident that the protrusions with the height within a range of 2–7 nm are formed on the base-body region of the air bearing surface depending on the length of the processing time of oxidation when applying and removing photoresist is performed. Specifically, the height of the protrusion is 3.7 nm when oxidation is performed for 10 minutes and it reaches 5 nm when oxidation is performed for about 20 minutes. Furthermore, not shown in figure, it is verified that the end face of the base body in the air bearing surface is slightly roughed about, for example, to 1–2 nm, even in a case where the step of applying and removing photoresist like the above-mentioned first embodiment is not performed.

Figure 9A:
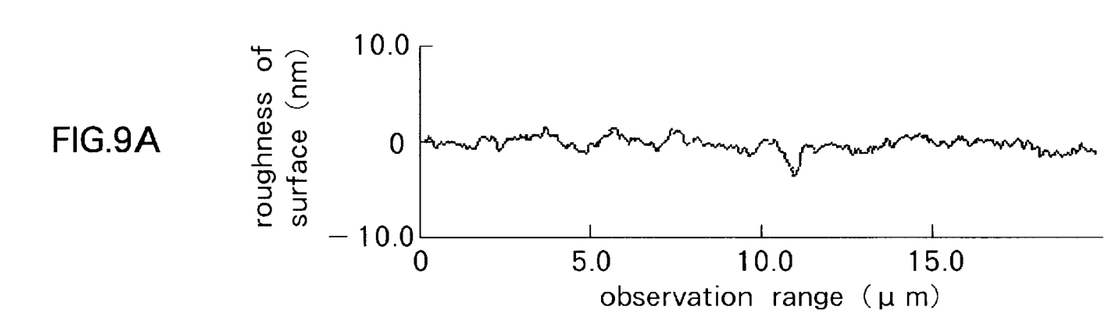
FIGS. 9A, 9B and 9C are AFM chart graphs showing roughness of the surface in each step of method of manufacturing the magnetic head according to the second embodiment of the invention.
Figure 9B:
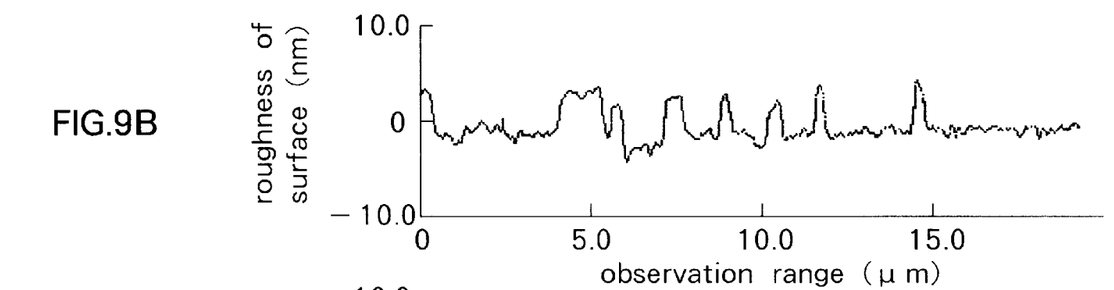
Figure 9C:
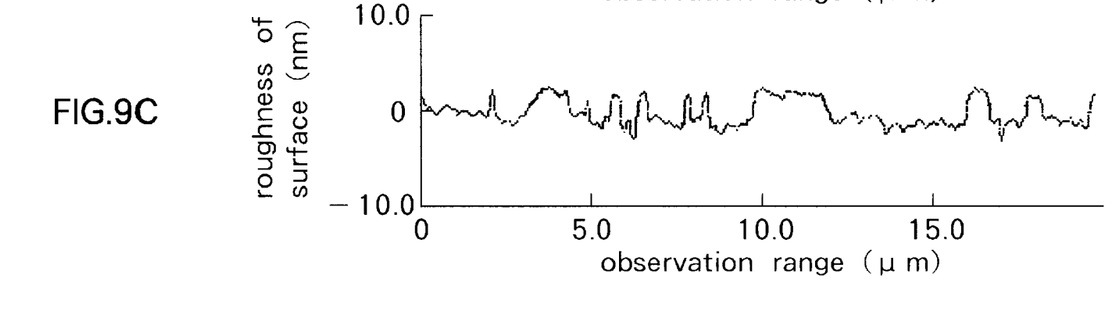

FIG. 9 shows the roughness of the base-body region of the air bearing surface in each step of the manufacturing method according to the second embodiment. Specifically, it is an AFM chart obtained through observing the state of the surface in each step by AFM. FIG. 9A shows a state of the surface after lapping the air bearing surface, FIG. 9B shows a state of the surface of the base-body of the air bearing surface after performing plasma oxidation, and FIG. 9C shows a state of the surface after forming the protective film made of DLC. In these figures, axis of ordinates represents the roughness (nm) and axis of abscissas represents the observation range of AFM ($\mu$m). Furthermore, the observation range of AFM was set to 15 $\mu$m×10 $\mu$m. As shown in FIGS. 9A and 9B, it is made evident that the roughness of about 5 nm can be provided on the air bearing surface by plasma oxidation. The surface of the air bearing surface is flattened to some degree (see FIG. 9C) after forming the protective film, however, it has the enough roughness to obtain the effects of the embodiment.

Figure 10:
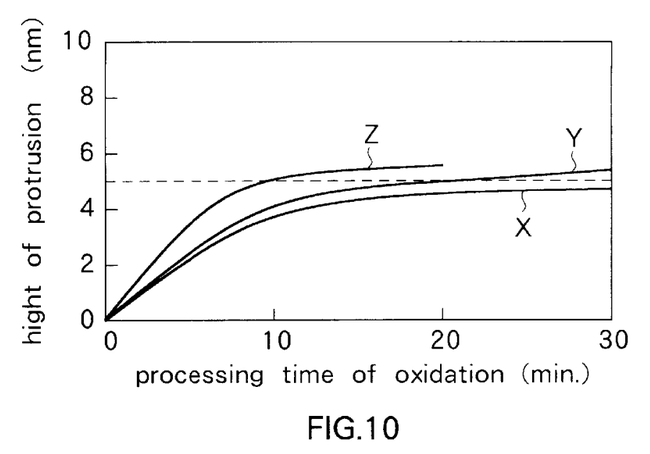
FIG. 10 is a characteristic graph showing correlation between oxidation condition and amount of protruding (height of protrusion) of the base-body region of the air bearing surface in the method of manufacturing the magnetic head according to the second embodiment of the invention.

FIG. 10 shows the relation between the processing time of plasma oxidation and the height of the protrusion of the air bearing surface for differenct varieties of RF electric power. Specifically, it is the result of measuring the height (amount of protruding) of the protrusion of the basebody of the air bearing surface using AFM after performing plasma oxidation on the air bearing surface for various oxidizing time when changing RF electric power from 200 W, to 300 W and 400 W respectively. Axis of ordinates represents the height h (nm) of the protrusion and axis of abscissas represents the processing time (minutes) of oxidation. Data X represents the result of a case with RF electric power being 200 W, data Y represents the result of RF electric power being 300 W and data Z represents the result of RF electric power being 400 W. As shown in FIG. 10, the amount of protruding on the base-body region of the air bearing surface becomes about 5 nm when performing oxidation with RF electric power being 200 W for 30 minutes, 300 W for 20 minutes and 400 W for 10 minutes respectively.

While the invention is described by referring to the two embodiments mentioned above, it is not limited to the above-mentioned embodiments but various modification is applicable. For example, in the above-mentioned embodiments, a case where the base body is formed with altic ($Al_2O_3$ TiC) is described, however, materials formed by dispersing grains made of metal (for example, titanium), silicon (Si) or compound of those and the like into the base material made of an insulating material can be used as the base body.

In the above-mentioned embodiments, a case where the base-body region of the air bearing surface is selectively made rough by plasma oxidation as a chemical processing is described, however, it can be also selectively made rough by thermal oxidation or other method of oxidation. Further, the base-body region can be also selectively made rough by nitriding processing or other chemical processing.

In the above-mentioned embodiments, a composite thin film magnetic head and a method of manufacturing the same are described, however, the invention can be applied to a magnetic head for recording only having an inductive-type magnetic transducer for writing or a magnetic head having an inductive-type magnetic transducer for both recording and reproducing. Further, the invention can be applied to a magnetic head having a configuration in which the stacking order of the element for writing and the element for reading is reversed.

According to the magnetic head or the magnetic disk apparatus of the invention described so far, adsorbing the recording medium during the operation can be effectively suppressed even when an end face of the head core part is smooth, since the roughness of an end face of the base body which is to face the recording medium is made rougher than that of the end face of the head core part. As a result, CSS characteristic can be improved.

Particularly according to the magnetic head or the magnetic disk apparatus of one aspect of the invention, adsorption of the head and the disk can be effectively suppressed without damaging the head core part even at the time of the starting/stopping operation, since the protrusions with a predetermined height are formed only on an end face of the base body among a flat surface which is to face the recording medium.

According to the magnetic head or the magnetic disk apparatus of another aspect of the invention, improving CSS characteristic and suppressing damage to the recording medium can be more effectively accomplished since the protrusions with the height between a range of 2 nm to 7 nm are formed only on an end face of the base body.

According to the method of manufacturing magnetic head of the invention, an end face of the base body is selectively made rough by performing chemical processing on the end face of the base body among a flat surface, including the end face of the base body and an end face of the head core part, which is to face the recording medium. As a result, appropriate roughness can be given only on the end face of the base body under excellent control without damaging the head core part comparing to a case where the surface is made rough by polishing using, for example, rough abrasive grain.

Particularly, according to the method of manufacturing the magnetic head of one aspect of the invention, roughing the surface can be performed promptly and effectively since, after forming a flat surface including an end face of the base body and an end face of the head core part, which is to face the recording medium, surface processing is performed on the end face of the base body, before selectively roughing the end face of the base body.

Obviously many modifications and variations of the present invention are possible in the light of the above teachings. It is therefore to be understood that within the scope of the appended claims the invention may be practiced otherwise than as specifically described.

What is claimed is:

1. A magnetic head comprising:
    a base body; and
    a head core part having a thin film layered structure laminated on the base body, the head core part including at least either a magnetic head element for writing or a magnetic head element for reading, wherein an end face of the base body and an end face of the head core part form a single flat surface which continuously extends to face a recording medium while the end face of the base body is rougher than the end face of the head core part, and a boundary of the end face of the head core part is within a boundary of the end face of the base body, and protrusions with a predetermined height are formed only on and protruded out of the end face of the base body in the flat surface, the protrusions are made of titanium oxide ($TiO_2$).

2. A magnetic head according to claim 1 wherein the base body is formed by dispersing grains made of at least either metal or metallic compound into a base material made of insulating substance.

3. A magnetic head according to claim 2 wherein the base body is formed by dispersing at least grains made of titanium carbide (TiC) into the base material made of aluminum oxide ($Al_2O_3$), and the protrusions are formed on the grains that are exposed to the end of the base body.

4. A magnetic head according to claim 1 wherein the height of the protrusions lies within a range of 2 nm to 7 nm.

5. A magnetic disk apparatus comprising a magnetic head which includes a base body and a head core part having a thin film layered structure laminated on the base body, the head core part including at least either a magnetic head element for writing or a magnetic head element for reading, wherein an end face of the base body and an end face of the head core part form a single flat surface which continuously extends to face a recording medium while the end face of the base body is rougher than the end face of the head core part, and a boundary of the end face of the head core part is within a boundary of the end face of the base body, and protrusions with a predetermined height are formed only on and protruding out of the end face of the base body in the flat surface, the protrusions are made of titanium oxide ($TiO_2$).

6. A magnetic disk apparatus according to claim 5 wherein the base body is formed by dispersing grains made of at least either metal or metallic compound into a base material made of insulating substance.

7. A magnetic disk apparatus according to claim 6 wherein the base body is formed by dispersing at least grains made of titanium carbide (TiC) into the base material made of aluminum oxide ($Al_2O_3$), and the protrusions are formed on the grains that are exposed to the end of the base body.

8. A magnetic disc apparatus according to claim 5 wherein the height of the protrusions lies within the range of 2 nm to 7 nm.

* * * * *

UNITED STATES PATENT AND TRADEMARK OFFICE
CERTIFICATE OF CORRECTION

PATENT NO. : 6,590,745 B1
DATED : July 8, 2003
INVENTOR(S) : Ichiro Yagi

It is certified that error appears in the above-identified patent and that said Letters Patent is hereby corrected as shown below:

<u>Title page, Item [54] and Column 1, lines 1-3,</u>
Please correct the title to read -- MAGNETIC HEAD WITH $TIO_2$ PROTRUSIONS ON BEARING SURFACE --.

<u>Column 12,</u>
Line 24, please correct claim 8 as follows -- A magnetic disk... --

Signed and Sealed this

Eleventh Day of November, 2003

JAMES E. ROGAN
*Director of the United States Patent and Trademark Office*